Jan. 2, 1923. 1,440,735.
W. HENRY.
TRANSMISSION BAND.
FILED AUG. 23, 1919.
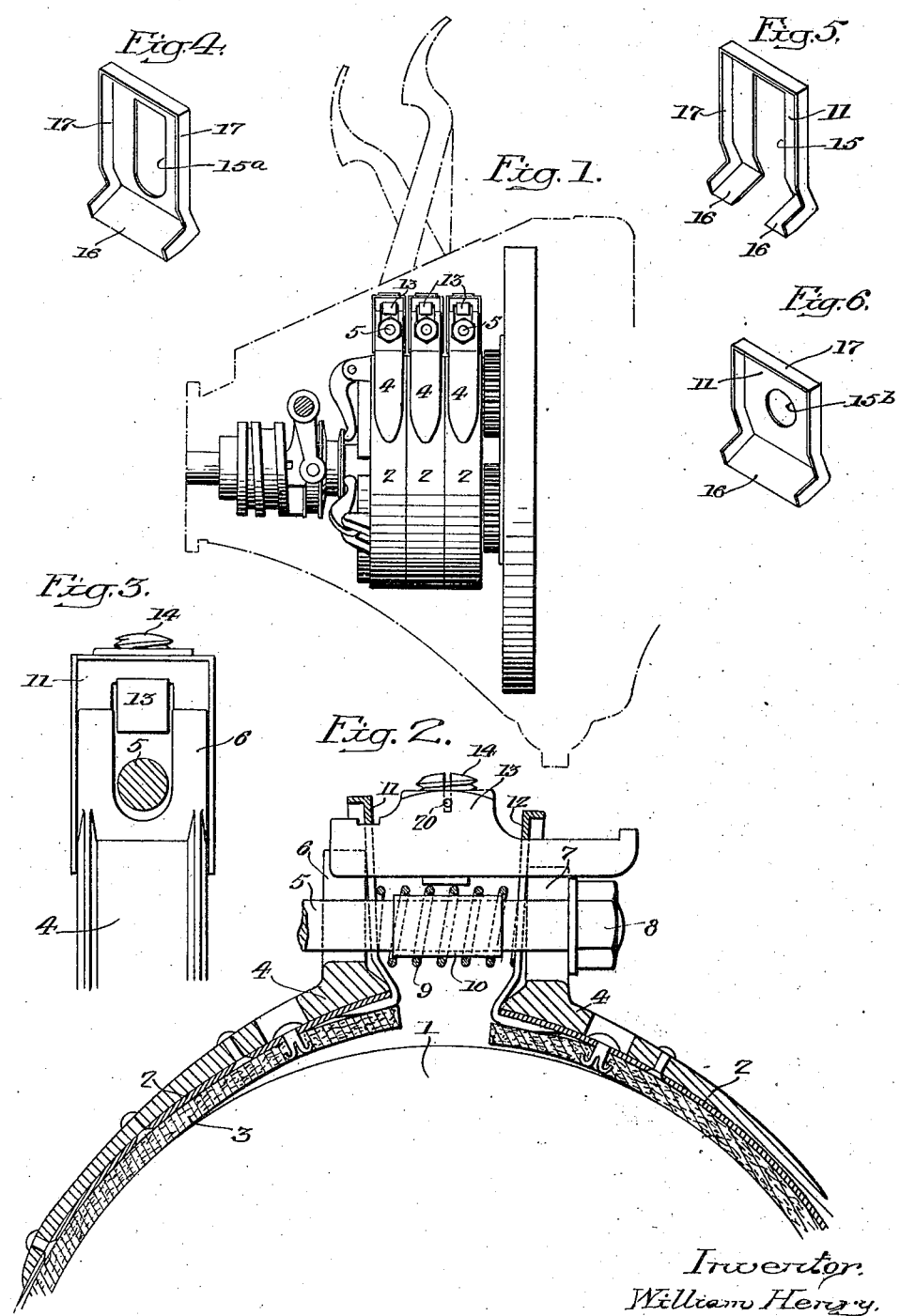
Inventor.
William Henry,
by his Attorneys.
Howson & Howson Patented Jan. 2, 1923.

1,440,735

UNITED STATES PATENT OFFICE.

WILLIAM HENRY, OF PHILADELPHIA, PENNSYLVANIA.

TRANSMISSION BAND.

Application filed August 23, 1919. Serial No. 319,337.

*To all whom it may concern:*

Be it known that I, WILLIAM HENRY, a citizen of the United States, residing in Philadelphia, Pennsylvania, have invented Transmission Bands, of which the following is a specification.

One object of my invention is to provide a relatively simple, easily applied and efficient device for preventing to a great extent the chattering of frictional braking and power transmitting bands such as are commonly employed on motor vehicles;—the arrangement and construction of parts being especially designed with a view to preventing unnecessary wear and glazing of the ends of the band.

Another object of the invention is to provide means for normally preventing the ends of a brake- or transmission band from normally resting upon the drum on which it is used and consequently preserving the flexibility of the lining of the band at its ends and causing it to better retain its lubricant absorbing properties.

These objects and other advantageous ends I attain as hereinafter set forth, reference being had to the accompanying drawings, in which, Fig. 1 is a side elevation illustrating my invention as applied to the transmission mechanism of a well known motor vehicle;

Fig. 2 is a side elevation, partly in section, illustrating the detail construction of my invention;

Fig. 3 is an end elevation of the combination shown in Fig. 2; and

Figs. 4, 5, and 6 are perspective views illustrating slightly different forms of band supporting plates.

In the above drawings 1 represents a brake or transmission drum having mounted upon it a flexible metallic band 2 provided with a suitable friction lining 3, riveted to its inside face. The ends of the flexible band 2 have riveted or otherwise fixed to them lugs 4 which at their extremities are forked and turned up parallel with each other.

The pedal- or controlling shaft 5 extends through these forks 6 and 7 and has at one end a nut 8 engaging the outside face of the latter fork. Between the forks there is mounted on the shaft 5 a coil spring 9 tending to force the lugs apart and thus open the brake band and in accordance with one feature of my invention I mount within this spring upon the shaft a sleeve or bushing 10 of such length that it will not interfere with the necessary coming together of the lugs when the brake is operated.

The primary feature of my invention however, consists in the provision of means whereby the two ends of the brake band are held out of engagement with the adjacent surface of the drum 1 and for this purpose I provide a pair of band-supporting plates 11 and 12 hung from the shaft 5 and maintained in position by the spring 9, their ends being bent at an angle to their general planes so that they serve as hooked members which extend under and support the respective ends of said brake band.

In the case shown for the purpose of supporting the plates 11 and 12 I have employed a yoke in the form of a bar 13 extending parallel with the end of the shaft 5 and above the same between the branches of the two forks 6 and 7, and adjustably support said yoke by a set screw 14 which rests upon the spring 9 immediately over the sleeve or bushing 10. It is noted that said bushing may be omitted in some cases without departing from by invention although I preferably employ it to support the coils of the spring 9.

In Fig. 2 I have shown the band-supporting plates as formed with slots 15 extending upwardly from their bent out ends 16 to within a short distance of their upper edges so that they may be placed upon and removed from the yoke 13 without the necessity of disturbing or dismantling any of the parts of the brake mechanism.

The bent out ends 16 are preferably inserted, as shown in Fig. 2, between the lining and the adjacent end of the steel band or strip 2, for which purpose I provide said ends with relatively sharp edges to facilitate their entrance. It will be noted that the supporting screw 14 is nearer one end of the yoke bar 13 than the other and that the two extremities of said bar are turned up or it is notched to prevent its longitudinal movement out of engagement with the two supporting plates 11 and 12. In the case shown the longer arm of said yoke or bar extends over the nut carrying end of the shaft 5 so that it provides for the necessary movement of the plate 12 toward and from the screw 14 as the band is applied or released.

With the above described arrangement of parts it will be seen that the two ends of the band with its lining are maintained elevated above and out of contact with the drum 1 so that while the apparatus as a whole is free to fulfill its customary functions, the extremities of said band are prevented from so dragging or engaging the drum as to cause the well known and highly objectionable chattering at the time the band is tightened to prevent or retard revolution of said drum.

In addition to this the unnecessary wear of the ends of the band is effectually prevented since they do not rest upon and consequently are not normally engaged by the rotating drum. In addition they do not quickly become glazed nor have their lubricant absorbing property in any way injured.

If desired the band supporting plates instead of being slotted through their lower or bent out ends, may merely be provided with an elongated vertical opening 15$^a$ for the passage of the shaft 5 and yoke bar 13 and it is to be noted that in some cases the yoke bar 13 may be altogether omitted and the band-supporting plates made as shown in Fig. 6 with a substantially circular hole 15$^b$ whereby they are formed to receive and rest directly upon the shaft 5. In order to stiffen the plates I preferably form them with edge ribs or flanges 17 and 18, although obviously these may be omitted without departing from my invention.

The distance of the ends of the band from the drum may be regulated by adjusting the position of the screw 14 in the bar or yoke 13 and the latter is provided with a hole for the reception of a pin 20 which extends through a slot in the screw 14 to retain this in any given position.

I claim:

1. The combination of a drum; a band for frictionally engaging the same; a hooked member engaging one end of said band; means including a shaft for causing the band to grip the drum; and means for supporting said hooked member from said shaft to normally hold the ends of the band out of engagement with the drum.

2. The combination of a drum; a band for frictionally gripping the same; lugs on the ends of said band; and means including a shaft, for causing the band to grip the drum; with means including a bar supported by said shaft, and independent of and in addition to said lugs, for normally holding the ends of the band out of engagement with the drum.

3. The combination of a drum; a band for frictionally engaging the same; lugs on the ends of the band; a device for drawing said lugs together to tighten the band; and means including a member independent of the lugs and supported by a portion of said device for normally maintaining both ends of the band out of engagement with the drum.

4. The combination of a drum; a band for frictionally gripping said drum; lugs for the ends of the band; a device for drawing the lugs together to cause the band to grip the drum; a member spanning the space between said lugs; and means for suspending the ends of the band from said member to keep them out of contact with the drum and prevent their chattering.

5. The combination of a drum; a band for frictionally engaging the same; lugs connected to the ends of said band; means including a shaft for drawing the lugs together to apply the band; with means including a member supported by said shaft and operative upon the ends of the band to normally hold them out of engagement with the drum.

6. The combination of a drum; a band for frictionally gripping the same; a member for drawing the ends of the band together to cause gripping of the drum; two elements respectively engaging the ends of the band; with a third element supported by said member and suspending said two elements.

7. The combination of a drum; a friction band operative thereon; lugs for the ends of said band; a shaft operative to draw said lugs together to cause gripping of the band on the drum; with two plates operative on the ends of the band to retain the same normally out of engagement with the drum and a bar supported on the shaft and carrying said plates.

8. The combination of a drum; a friction band operative thereon; lugs on the ends of said band; a shaft for drawing said lugs together to cause gripping of the band; with two independently removable plates supported by the shaft and having their ends turned in opposite directions in positions to extend under and normally support the band out of engagement with the drum.

9. The combination of a drum; a friction band thereon; lugs mounted on the ends of the friction band; a member for drawing said ends together to cause gripping of the band; a bar supported by said member and guided by the lugs; with elements suspended from said bar and normally holding the ends of the band out of engagement with the drum.

10. The combination of a drum; a friction band thereon; lugs mounted on the ends of the friction band; a member for drawing said ends together to cause gripping of the band; a bar supported by said member and guided by the lugs; elements suspended from said bar and normally holding the ends of the band out of engagement with the drum; with means for adjusting the position of said band relatively to the supporting member to regulate the positions of the ends of the bands relatively to the drum.

11. The combination of a drum; a friction band therefor; a pair of forked lugs respectively connected to the ends of the band; an operating shaft extending through the forks of said lugs; a bar guided by said lugs and supported on the shaft; with two plates hung from said bar and having their ends respectively engaging the ends of the friction band to normally retain the same out of engagement with the drum.

12. The combination of a drum; a friction band therefor; a pair of forked lugs respectively connected to the ends of the band; an operating shaft extending through the forks of said lugs; a bar guided by said lugs and supported on the shaft; with two plates hung from said bar and having their ends respectively engaging the ends of the friction band to normally retain the same out of engagement with the drum, said lugs being longitudinally slotted to permit of their insertion and removal independently of the shaft.

13. The combination of a drum; a friction band operative thereon; lugs respectively attached to the ends of said band; an operating shaft extending through said lugs; a spring on the shaft between the lugs; a sleeve within the spring upon the shaft; a bar guided by the lugs and supported upon the spring; with plates hung from said bar and having their ends detachably engaging the ends of the band respectively.

14. The combination of a drum; a friction band operative thereon; lugs for the ends of said band; an operating shaft extending through said lugs; a bar guided by the lugs; an adjusting screw extending through the bar and supporting it from the shaft; with two plates hung from the bar and having their ends turned in opposite directions in engagement with the ends of the bar respectively.

15. The combination of a drum; a band frictionally engaging the same and having projecting lugs at its ends; means including a shaft for drawing said lugs together; a member structurally independent of the lugs and operative upon one of the ends of the band; and means including a screw for adjustably supporting said member on said shaft.

16. The combination of a drum; a friction band operative thereon and having lugs at its ends; a member for drawing said ends together to cause the band to grip the drum; a spring acting on the lugs to press them apart; a structurally independent element for normally holding one of the ends of the band out of engagement with the drum interposed between the spring and the lug on said end; and means for adjustably supporting said element from said band operating member.

In witness whereof I affix my signature.

WILLIAM HENRY.